United States Patent
Yoon et al.

(10) Patent No.: US 11,101,994 B2
(45) Date of Patent: Aug. 24, 2021

(54) METHOD OF PROVISIONING KEY INFORMATION AND APPARATUS USING THE METHOD

(71) Applicant: SAMSUNG SDS CO., LTD., Seoul (KR)

(72) Inventors: Hyo-Jin Yoon, Seoul (KR); Kyu-Young Choi, Seoul (KR); Duk-Jae Moon, Seoul (KR); Ji-Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 139 days.

(21) Appl. No.: 16/118,102

(22) Filed: Aug. 30, 2018

(65) Prior Publication Data

US 2019/0097795 A1   Mar. 28, 2019

(30) Foreign Application Priority Data

Sep. 26, 2017   (KR) .......................... 10-2017-0124455

(51) Int. Cl.
*G06F 21/00* (2013.01)
*H04L 9/08* (2006.01)

(52) U.S. Cl.
CPC ............ *H04L 9/0869* (2013.01); *H04L 9/088* (2013.01); *H04L 9/0866* (2013.01)

(58) Field of Classification Search
CPC ..... H04L 9/0869; H04L 9/0866; H04L 9/088; H04L 9/08; H04L 9/0816; G06F 21/72
See application file for complete search history.

(56) References Cited

U.S. PATENT DOCUMENTS

| | | | | |
|---|---|---|---|---|
| 6,307,940 B1 * | 10/2001 | Yamamoto | ............ | H04L 9/0662 380/277 |
| 7,065,214 B2 * | 6/2006 | Ishiguro | .................. | G06F 21/10 380/268 |
| 7,133,524 B2 * | 11/2006 | Fujiwara | ............... | H04L 9/0822 380/45 |
| 7,400,723 B2 * | 7/2008 | Romain | .................. | H04L 9/003 380/255 |
| 7,688,976 B2 * | 3/2010 | Singhal | ................... | G06F 7/582 380/46 |

(Continued)

FOREIGN PATENT DOCUMENTS

| KR | 10-2015-0040576 A | 4/2015 |
|---|---|---|
| KR | 10-2017-0050026 A | 5/2017 |

OTHER PUBLICATIONS

Communication dated Feb. 19, 2020 issued by the Korean Intellectual Property Office in counterpart Korean Application No. 10-2017-0124455.

(Continued)

*Primary Examiner* — Hosuk Song
(74) *Attorney, Agent, or Firm* — Sughrue Mion, PLLC

(57) ABSTRACT

A method of provisioning key information and a device using the method are provided. The method of provisioning key information according to one embodiment of the present disclosure includes generating key information for encryption and decryption from seed information using a key information generation algorithm and deleting code that corresponds to the key information generation algorithm from the device based on the generation of the key information.

16 Claims, 2 Drawing Sheets

(56) References Cited

U.S. PATENT DOCUMENTS

| | | | |
|---|---|---|---|
| 8,000,470 B2* | 8/2011 | Vanstone | H04L 9/0869 |
| | | | 380/44 |
| 8,194,858 B2* | 6/2012 | Bukshpun | H04L 9/0838 |
| | | | 380/268 |
| 8,321,682 B1* | 11/2012 | Read | G06F 21/31 |
| | | | 713/183 |
| 8,499,157 B1* | 7/2013 | Juels | H04W 12/0401 |
| | | | 713/171 |
| 8,953,790 B2* | 2/2015 | Qi | H04L 9/0869 |
| | | | 380/44 |
| 9,628,875 B1 | 4/2017 | Roth et al. | |
| 9,742,563 B2 | 8/2017 | Gotze et al. | |
| 2005/0010788 A1 | 1/2005 | Craft | |
| 2012/0137137 A1 | 5/2012 | Brickell et al. | |

OTHER PUBLICATIONS

Sehun Kwon, "Mondex Card Business Status and Prospects and Implications", Information and Communication Policy Institute Management Strategy Lab., 1997, pp. 37-55, 21 pages total.

"The Beginning of the Encryption Platform", D'Amo, All That Encryption, 2016. (3 pages total).

Communication dated Nov. 24, 2020 by the Korean Intellectual Property Office in counterpart Korean Patent Application No. 10-2017-0124455.

International Search Report (PCT/ISA/210) dated Jan. 3, 2019 issued by the International Searching Authority in International Application No. PCT/KR2018/010704.

\* cited by examiner

METHOD OF PROVISIONING KEY INFORMATION AND APPARATUS USING THE METHOD

CROSS-REFERENCE TO RELATED APPLICATION

This application claims the benefit under 35 USC § 119(a) of Korean Patent Application No. 10-2017-0124455, filed on Sep. 26, 2017, in the Korean Intellectual Property Office, the entire disclosure of which is incorporated herein by reference for all purposes.

BACKGROUND

1. Field

The following description relates to technology for provisioning key information.

2. Description of the Related Art

In order to authenticate an individual device, unique information, that is, key information for authentication, must be provisioned to each device.

To this end, conventionally, a method in which different key information is individually provisioned to each device in the factory manufacturing process or costly hardware in which a different key is embedded is installed in each device has been used. However, there are problems in that device production cost is increased and the production efficiency is lowered.

In addition, in the Internet of Things (IoT) environment, key provisioning at the factory side is unable to be performed for low-end IoT devices that are exponentially growing. That is, in the case of the low-end IoT devices, the same software is inevitably installed in all the devices at the factory and as a result, there is no way to authenticate individual devices.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a method of provision key information and a device using the method.

In one general aspect, there is provided a method of provisioning key information, performed by a device including at least one processor and a memory storing at least one program for executing the method, the method including: generating key information for encryption and decryption from seed information using a key information generation algorithm; and deleting code that corresponds to the key information generation algorithm from the device based on the generation of the key information.

The code that corresponds to the key information generation algorithm may be preloaded to the device during a manufacturing process of the device, the code further corresponding to a cryptographic algorithm to be used in the encryption and the decryption using the key information.

The generating the key information may be performed while a test is being conducted on the cryptographic algorithm after the code is preloaded to the device.

The code that corresponds to the key information generation algorithm may be deleted by using a deletion algorithm for deleting the key information generation algorithm, and the code that corresponds to the key information generation algorithm may be preloaded to the device during the manufacturing process of the device, the code further corresponding to the cryptographic algorithm and the deletion algorithm.

The seed information may include unique information of the device.

The unique information may include at least one of a serial number, hardware information, and a media access control (MAC) address of the device.

The method may further include, after deleting the code that corresponds to the key information generation algorithm, providing the unique information to a server.

The seed information may include information pre-allocated to the device by a server.

In another general aspect, there is provided a device including at least one processor and a memory storing at least one program configured to be executed by the at least one processor, and wherein the at least one program include computer-readable codes to perform operations comprising: generating key information for encryption and decryption from seed information using a key information generation algorithm; and deleting code that corresponds to the key information generation algorithm from the device based on the generation of the key information.

The code that corresponds to the key information generation algorithm may be preloaded to the device during a manufacturing process of the device, the code further corresponding to a cryptographic algorithm to be used in the encryption and the decryption using the key information.

The generating the key information may be performed while a test is being conducted on the cryptographic algorithm after the code is preloaded to the device.

The code that corresponds to the key information generation algorithm may be deleted by using a deletion algorithm for deleting the key information generation algorithm, and the code that corresponds to the key information generation algorithm may be preloaded to the device during the manufacturing process of the device, the code further corresponding to the cryptographic algorithm and the deletion algorithm.

The seed information may include unique information of the device.

The unique information may include at least one of a serial number, hardware information, and a MAC address of the device.

The at least one or more program may include additional commands to perform further operations comprising providing the unique information to a server after deleting the code that corresponds to the key information generation algorithm.

The seed information may include information pre-allocated to the device by a server.

Other features and aspects will be apparent from the following detailed description, the drawings, and the claims.

Figure 1:
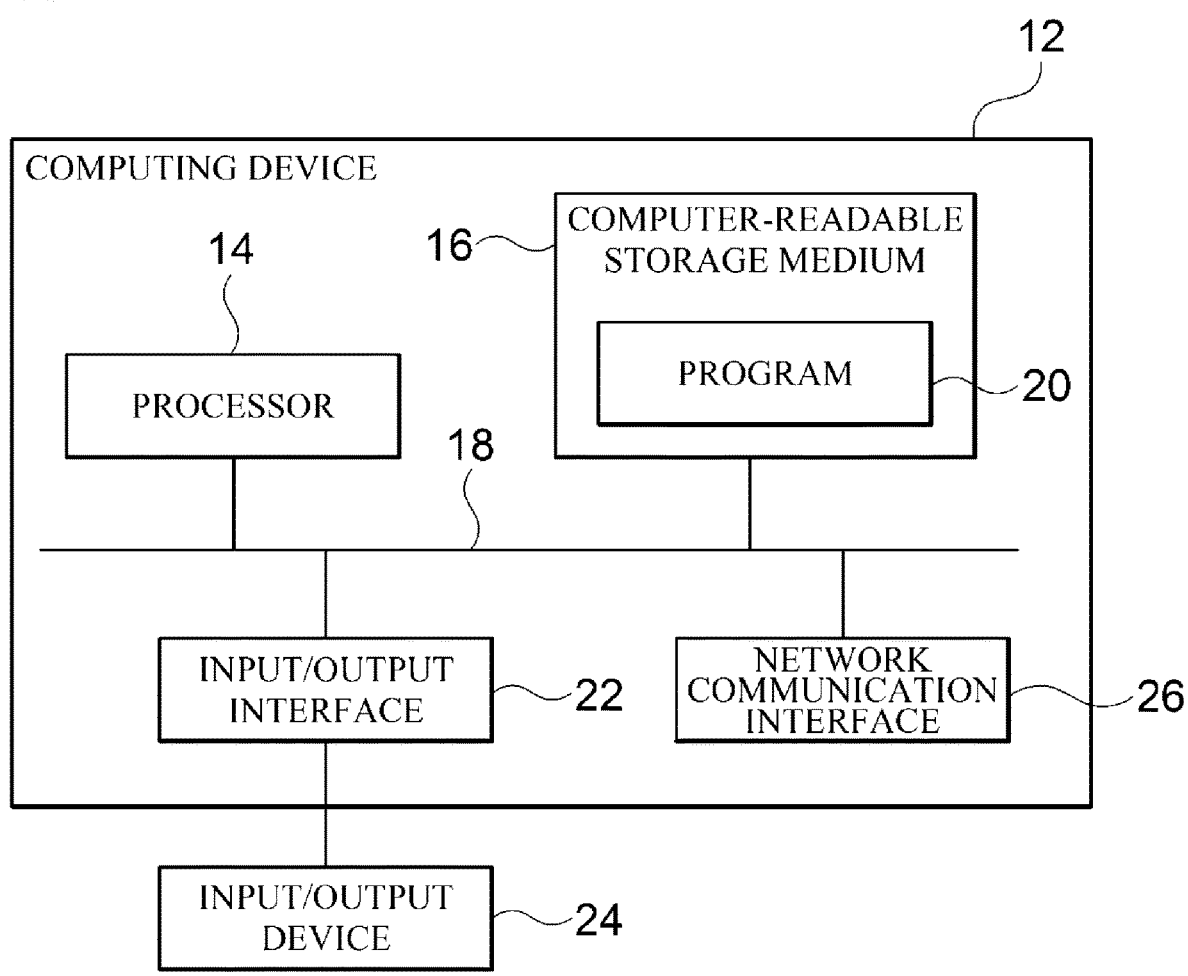
FIG. 1 is a block diagram for describing a computing environment including a computing device suitable to use in exemplary embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a block diagram for describing a computing environment including a computing device suitable to use in exemplary embodiments. In the illustrated embodiments, each of the components may have functions and capabilities different from those described hereinafter and additional components may be included in addition to the components described herein.

The illustrated computing environment 10 includes a computing device 12. In one embodiment, the computing device 12 may include, for example, a smartphone, a phablet device, a tablet personal computer (PC), a laptop PC, a wearable device, a door lock, and the like. However, in addition to the above examples, the computing device 12 may include various forms of devices capable of information processing and communication.

Meanwhile, the computing device 12 includes at least one processor 14, a computer-readable storage medium 16, and a communication bus 18. The processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer-readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 interconnects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

The computing device 12 generates key information for encryption/decryption from seed information using a key information generation algorithm.

In this case, according to one embodiment of the present disclosure, the key information generation algorithm may be preloaded in the computing device 12 in the process of manufacturing the computing device 12, together with an cryptographic algorithm to be used in encryption/decryption using the key information generated by the key information generation algorithm. For example, the key information generation algorithm and the cryptographic algorithm may be installed in the computing device 12 in the form of a software image prior to factory shipment of the computing device 12.

In addition, according to one embodiment of the present disclosure, the key information may be generated in the process of conducting test on the cryptographic algorithm after the key generation algorithm, which is installed along with the cryptographic algorithm, is installed in the computing device 12. For example, the key information may be generated by the key generation algorithm when the cryptographic algorithm installed in the computing device 12 is initially executed for testing.

According to one embodiment of the present disclosure, the key information generation algorithm may generate the key information by generating a random number from seed information or applying a hash function to the seed information. However, a method of generating the key information is not limited to the above examples and a variety of cryptographically safe functions which are capable of generating output values that differ according to input values and are difficult to predict from the input values may be used.

Meanwhile, according to one embodiment of the present disclosure, the seed information may include unique information of the computing device 12 and may further include a random number in addition to the unique information of the computing device 12 according to an embodiment. In this case, the unique information of the computing device 12 may include at least one of, for example, serial number of the computing device, hardware information (e.g., unique ID of a chip mounted in the computing device 12), and a media access control (MAC) address. However, the unique information used as seed information is not necessarily limited to the above examples and may include a variety of information that is accessible in a software manner by the key information generation algorithm and has a different value according to the computing device 12.

Meanwhile, according to one embodiment of the present disclosure, the seed information may include information pre-allocated to the computing device 12 by a server (not shown). In this case, the server may refer to a server for performing authentication of the computing device 12 or performing encrypted communication with the computing device 12. For example, the server may generate a unique number for each computing device 12, and the unique number generated by the server may be allocated to each computing device 12 in the process of manufacturing each computing device 12. Meanwhile, the information pre-allocated by the server is not necessarily a unique number, but any information will do as long as it is generated by the server and is not redundant for each computing device 12.

According to one embodiment of the present disclosure, the key information may be, for example, an encryption key for encryption/decryption. Specifically, the cryptographic algorithm installed together with the key information generation algorithm may be, for example, a symmetric cryptographic algorithm, such as an advanced encryption standard (AES) algorithm, a data encryption standard (DES) algorithm, or a 3DES algorithm, and the key information generation algorithm may be an encryption key used in the corresponding symmetric cryptographic algorithm.

According to another embodiment of the present disclosure, the key information may be, for example, a key table for encryption/decryption. Specifically, the cryptographic algorithm installed together with the key information generation algorithm may be, for example, a white-box cryptographic algorithm, and the key information generated by the key information generation algorithm may be a key table to be applied to the corresponding white-box cryptographic algorithm.

Meanwhile, the computing device 12 deletes the key information generation algorithm after the key information is generated by the key generation algorithm.

According to one embodiment of the present disclosure, deletion of the key generation algorithm may be executed using a deletion algorithm preloaded together with the key generation algorithm and the cryptographic algorithm. The deletion algorithm may be installed, together with, for example, the key information generation algorithm and the cryptographic algorithm, in the computing device 12 in the form of a software image prior to factory shipment of the computing device 12.

As described above, since the key generation algorithm is deleted after the key information is generated, any correlation between the seed information and the key information does not remain.

According to one embodiment of the present disclosure, the computing device 12 may perform device authentication in association with the server or may transmit and received encrypted data to and from the server using the generated key information and the installed cryptographic algorithm. To this end, the server may be provided with the same algorithms as the key information generation algorithm and cryptographic algorithm preloaded in the computing device 12. In addition, the server may share the seed information used in generating the key information in the computing device 12 with the computing device 12.

For example, when the seed information used in generating the key information in the computing device 12 is unique information of the computing device 12, the computing device 12 may transmit the unique information of the computing device 12, which is used as the seed information, to the server. In this case, the server may generate the same key information as that of the computing device 12 from the received unique information using the key information generation algorithm and may device authentication in association with the computing device 12 or transmit or receive encrypted data to and from the computing device 12 using the generated key information and the cryptographic algorithm.

In another example, when the seed information used in generating the key information in the computing device 12 is information allocated to the computing device 12 by the server, the server may generate the same key information as that of the computing device 12 from the information allocated to the computing device 12 using the key information generation algorithm, and may perform device authentication in association with the computing device 12 or transmit and receive encrypted data to and from the computing device 12 using the generated key information and the cryptographic algorithm.

Figure 2:
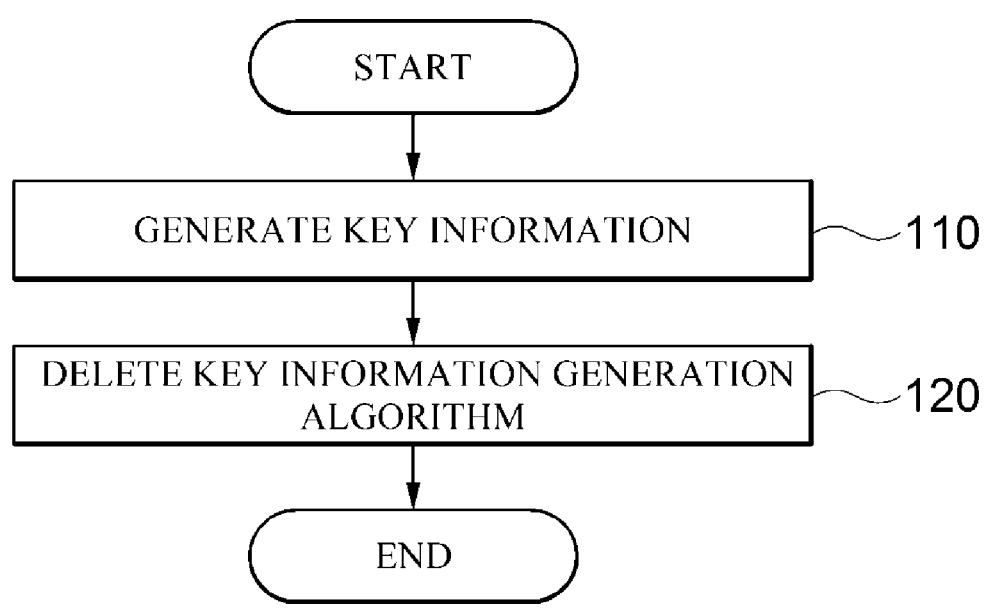
FIG. 2 is a flowchart illustrating a method of provisioning key information according to one embodiment of the present disclosure.

FIG. 2 is a flowchart illustrating a method of provisioning key information according to one embodiment of the present disclosure.

The method shown in FIG. 2 may be performed by, for example, the computing device 12 shown in FIG. 1.

Referring to FIG. 2, the computing device 12 generates key information for encryption/decryption from seed information using a key information generation algorithm (110).

Here, the key information generation algorithm may be preloaded in the computing device 12 in the process of manufacturing the computing device 12, together with a cryptographic algorithm. For example, the key information generation algorithm and the cryptographic algorithm may be installed in the computing device 12 in the form of a software image prior to shipment of the computing device 12. The key information may be generated in the process of conducting test on the cryptographic algorithm.

In addition, the cryptographic algorithm may be, for example, symmetric cryptographic algorithm, and the key information may be an encryption key to be used in the corresponding symmetric cryptographic algorithm.

In another example, the cryptographic algorithm may be, for example, a white-box cryptographic algorithm, and the key information may be a key table to be applied to the corresponding white-box cryptographic algorithm.

According to one embodiment of the present disclosure, the seed information may include unique information of the computing device 12, and may further include a random number in addition to the unique information of the computing device 12 according to an embodiment. In this case, the unique information of the computing device 12 may include at least one of, for example, serial number of the computing device, hardware information (e.g., unique ID of a chip mounted in the computing device 12), and a MAC address.

In addition, according to one embodiment of the present disclosure, the seed information may include information pre-allocated to the computing device 12 by a server.

Meanwhile, after the key information is generated by the key information generation algorithm, the computing device 12 deletes the key information generation algorithm (120).

At this time, according to one embodiment of the present disclosure, deletion of the key information generation algorithm may be performed using a deletion algorithm, which is preloaded together with the key generation algorithm and the cryptographic algorithm.

According to one embodiment of the present disclosure, when the key information is generated using the unique information of the computing device 12, the computing device 12 may provide the unique information, which is used for key information generation, to the server after deleting the key generation algorithm.

In the flowchart illustrated in FIG. 2, the key information provisioning process is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

According to the embodiments of the present disclosure, after the same software is installed in individual devices manufactured in a factory, different key information is allowed to be generated for each device, so that the key information does not have to be separately provisioned to each manufactured device, and accordingly production cost can be reduced and the production efficiency can be improved.

Furthermore, after key information is generated, an algorithm that has been installed to generate the key information is deleted, so that the link between the key information and seed information used for generating the key information is fundamentally removed and accordingly safety and security can be ensured even when the seed information is disclosed.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of provisioning key information, performed by a device including at least one processor and a memory storing at least one program for executing the method, the method comprising:
   generating key information for encryption and decryption from seed information using a key information generation algorithm; and
   deleting code that corresponds to the key information generation algorithm from the device based on the generation of the key information.

2. The method of claim 1, wherein the code that corresponds to the key information generation algorithm is preloaded to the device during a manufacturing process of the device, the code further corresponding to a cryptographic algorithm to be used in the encryption and the decryption using the key information.

3. The method of claim 2, wherein the generating the key information is performed while a test is being conducted on the cryptographic algorithm after the code is preloaded to the device.

4. The method of claim 2, wherein the code that corresponds to the key information generation algorithm is deleted by using a deletion algorithm for deleting the key information generation algorithm, and
   wherein the code that corresponds to the key information generation algorithm is preloaded to the device during the manufacturing process of the device, the code further corresponding to the cryptographic algorithm and the deletion algorithm.

5. The method of claim 1, wherein the seed information includes unique information of the device.

6. The method of claim 5, wherein the unique information includes at least one of a serial number, hardware information, and a media access control (MAC) address of the device.

7. The method of claim 5, further comprising, after deleting the code that corresponds to the key information generation algorithm, providing the unique information to a server.

8. The method of claim 1, wherein the seed information includes information pre-allocated to the device by a server.

9. A device comprising:
   at least one processor; and
   a memory storing at least one program configured to be executed by the at least one processor, and
   wherein the at least one program includes computer-readable codes to perform operations comprising:
   generating key information for encryption and decryption from seed information using a key information generation algorithm; and
   deleting code that corresponds to the key information generation algorithm from the device based on the generation of the key information.

10. The device of claim 9, wherein the code that corresponds to the key information generation algorithm is preloaded to the device during a manufacturing process of the device, the code further corresponding to a cryptographic algorithm to be used in the encryption and the decryption using the key information.

11. The device of claim 10, wherein the generating the key information is performed while a test is being conducted on the cryptographic algorithm after the code is preloaded to the device.

12. The device of claim 10, wherein the code that corresponds to the key information generation algorithm is deleted by using a deletion algorithm for deleting the key information generation algorithm, and
   wherein the code that corresponds to the key information generation algorithm is preloaded to the device during the manufacturing process of the device, the code further corresponding to the cryptographic algorithm and the deletion algorithm.

13. The device of claim 9, wherein the seed information includes unique information of the device.

14. The device of claim 13, wherein the unique information includes at least one of a serial number, hardware information, and a media access control (MAC) address of the device.

15. The device of claim 13, wherein the at least one program includes additional commands to perform further operations comprising providing the unique information to a server after deleting the code that corresponds to the key information generation algorithm.

16. The device of claim 9, wherein the seed information includes information pre-allocated to the device by a server.

* * * * *